Aug. 19, 1952 W. B. KUNZ 2,607,696
PROCESS OF FORMING A FOOD PACKAGE
Filed Jan. 28, 1948

WALTER B KUNZ
INVENTOR
BY Thomas R O'Nally
ATTORNEY

Patented Aug. 19, 1952

2,607,696

UNITED STATES PATENT OFFICE 2,607,696

PROCESS OF FORMING A FOOD PACKAGE

Walter B. Kunz, Fredericksburg, Va., assignor to American Viscose Corporation, Wilmington, Del., a corporation of Delaware Application January 28, 1948, Serial No. 4,884

4 Claims. (Cl. 99—171)

This invention relates to sealing and joining hydrophilic sheet materials and to articles produced thereby. More particularly, this invention relates to sealing and joining together hydrophilic sheet materials to form wrappers or containers for food products and to packages comprising food products in sealed wrappers or containers of hydrophilic materials.

With the advent of regenerated cellulose there was provided a new type of material which was excellent for laminating, wrapping and packaging. There have also been developed other types of sheet materials, namely, films of cellulose acetate and so-called moistureproof regenerated cellulose which is a film of regenerated cellulose having a moistureproof thermoplastic coating on the surface thereof.

For certain uses the coated regenerated cellulose is preferable to the uncoated sheeting since it is possible to seal the coated sheeting by the application of heat and pressure with or without a solvent. Likewise, it has been possible to seal moistureproof regenerated cellulose or cellulose acetate sheeting by applying to the surface thereof one of the organic solvents in which the materials are soluble, thus forming an adhesive in situ by dissolving part of the surface material. However, it invariably has been found that similar methods may not be successfully applied to hydrophilic cellulosic materials such as uncoated regenerated cellulose, inasmuch as these hydrophilic materials are neither heat-sealable nor soluble in common organic solvents. There have been several attempts to provide other methods for sealing hydrophilic cellulosic materials, but none of these other methods has proved very satisfactory. For example, it has been proposed heretofore to use as an adhesive substance, a solution of viscose which is applied to the surface of the hydrophilic cellulosic material and the cellulose of the viscose regenerated in situ. However, this method of sealing cellulosic materials is very slow inasmuch as the viscose solution must be coagulated, regenerated, desulfurized and washed after it is applied to the surface, so that this method cannot be used in high speed machinery. In addition, hydrogen sulfide is given off during the regeneration of the viscose and this tends to contaminate any articles or materials with which it comes into contact. Obviously, these disadvantages make the method completely unsatisfactory for use in wrapping and packaging by automatic machinery.

It has also been proposed heretofore to seal cellulose sheet materials such as regenerated cellulose by means of an aqueous solution of zinc chloride which is applied to the surface of the cellulose sheet material, thus dissolving some of the cellulose from the surface and forming an adhesive solution in situ. Unfortunately, this method of sealing regenerated cellulose is likewise unsatisfactory since the action of the chloride is relatively slow and since it is toxic. In particular, the toxicity of zinc chloride renders it undesirable for use in connection with food products, medicinals, and other substances intended for human consumption.

This invention has for its principal object to provide methods of sealing and joining hydrophilic sheet materials and to provide packages comprising food products in sealed wrappers or containers of hydrophilic sheet material that overcome objections and disadvantages found in the prior art.

Another object of the invention is to provide improved methods for sealing and joining hydrophilic sheet materials.

A further object of the invention is to provide improved packages comprising food products in sealed wrappers or containers of hydrophilic sheet material.

Other objects and advantages of the invention will be apparent from the following description and accompanying drawing in which is shown a form of apparatus with which the invention may be practiced and forms of food packages embodying the invention.

Figure 1:
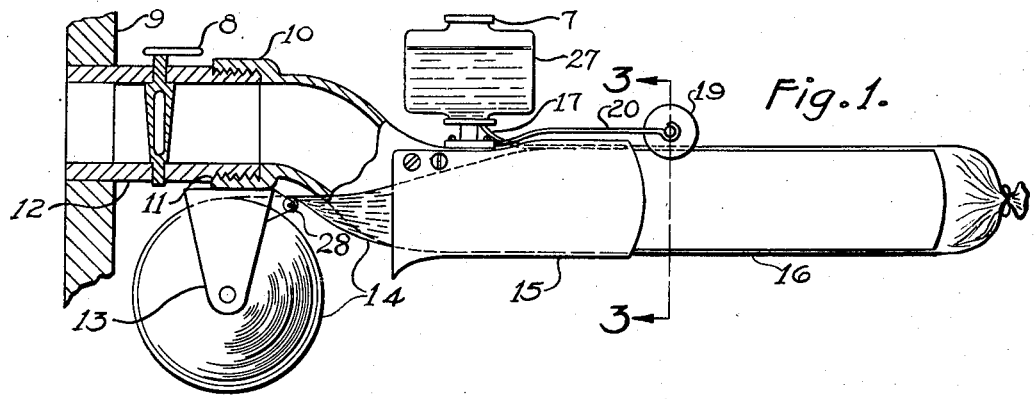
Figure 1 is a side elevation partly in section of a form of apparatus with which the invention may be practiced.

This invention in general comprises rapidly and securely sealing or joining together hydrophilic sheet material by means of an acidified solution of a water-soluble partially polymerized heat-hardening resin to form a wrapper or container for a food product wrapped or enclosed in hydrophilic sheet material that is so sealed or joined together.

The sealing material which is of a non-toxic nature that does not promote or favor the decomposition of the food product is applied to a portion of the hydrophilic sheet material and another portion of the hydrophilic sheet material is placed on the applied sealing material. The overlapped or superposed sheet material is then subjected to heat and pressure sufficient to advance or complete the polymerization of the resin. At least a portion of the water is driven off and part of the acid may remain.

The sheet material may be partially sealed or joined together and then filled with the food product, or the sheet material may be formed into the container or wrapper and sealed or joined together as it is being filled with the food product.

The sheet material either in the form of a flat sheet or tube can be sealed or joined when it is either wet or dry.

The following are examples of hydrophilic sheet material that is contemplated in this invention: regenerated cellulose, denitrated cellulose nitrate, alkali-soluble water-insoluble cellulosic materials such as carboxy-alkyl cellulose ethers, mixed carboxy-alkyl cellulose ethers, cellulose-ether xanthates, cellulose xantho-ether, cellulose thiourethans, cellulose xantho fatty acids, and special types of paper such as parchment paper and waxed paper.

The sealing material that is used is an acidified aqueous solution of a partially polymerized water-soluble heat-hardening resin the polymerization of which resin is accelerated by the presence of an acid in aqueous solution. Such resins that are suitable include the aminoplast resins such as the urea-formaldehyde and melamine-formaldehyde resins and other types of resins such as ketone-formaldehyde resins and certain types of phenolic resins. The solution is acidified by any non-toxic acid, acidic, or acid forming, substance that will dissolve readily in water to give a resin solution the pH of which lies in the range of 4.5 to 5.5, for example, 1—such organic acids as lactic acid, acetic acid, citric acid, and tartaric acid, 2—certain inorganic salts such as ammonium chloride, ammonium sulfate, and monobasic ammonium phosphate.

In sealing or joining the hydrophilic sheet material together, the aqueous resin solution is applied to the portion of the sheet material that is to be sealed or joined together and the material to which the aqueous resin solution has been applied is overlapped or superposed and subjected to heat and pressure sufficient to drive off the water and to polymerize the resin to the heat-hardened state. Heating to a temperature of approximately 180 to 220° C. is found sufficient in most cases. The acid in the solution serves as a polymerizing catalyst for the resin.

The following are examples of the practice of the invention:

*Example 1*

A casing was prepared by shaping a strip of hydrophilic regenerated cellulose into a tubular casing and sealing the edges of the strip by means of an aqueous solution containing a water-soluble heat-hardening melamine-formaldehyde resin (sold under the trade name Melmac 7273—7) and lactic acid in the ratio 69.3 to 1. The lactic acid served as a catalyst for the polymerization of the resin. After the resin solution had been applied to the edges of the strip of regenerated cellulose, the edges were pressed together and heated to approximately 180 to 220° C. The heat treatment was sufficient to polymerize the resin to produce a water-resistant seal.

*Example 2*

A casing was prepared by shaping a strip of de-nitrated cellulose nitrate into a tubular casing and sealing the edges of the strip by means of a solution containing a water-soluble heat-hardening melamine-formaldehyde resin (sold under the trade name Melmac 470) and lactic acid in the ratio 13.7 to 1. After the resin solution had been applied to the edges of the strip of regenerated cellulose, the edges were pressed together and heated to approximately 180° C. The casing was drawn from the forming plate and tested. Pressures as high as approximately four pounds per square inch were required to burst casings that had been immersed in both hot and cold water.

*Example 3*

A casing was prepared by the procedure described in Example 2 above, using a hydrophilic regenerated cellulose strip and an aqueous solution containing a water-soluble heat-hardening melamine formaldehyde resin (sold under the trade name Melmac 470) and lactic acid in the ratio 13.7 to 1. The resin seal was heated to approximately 180° C. Tests indicated that pressures as high as two pounds per square inch were required to burst casings that had been immersed in both hot and cold water. The pH of a mixture of 100 ml. of distilled water and 6 grams of the sealed casing was 5.2.

*Example 4*

A casing was prepared by shaping a strip of de-nitrated nitrocellulose into a tubular casing and the edges of the strip were overlapped and sealed with an aqueous solution containing 67.95% melamine-formaldehyde resin (sold under the trade name Melmac 470 B—380) and 4.93% lactic acid. The overlapping edges of the tube to which the sealing material had been applied were pressed with a roller and then heated to a temperature of 180° C. to remove the water from the resin solution and polymerize the resin to form a secure bond or seal that was waterproof.

Figure 2:
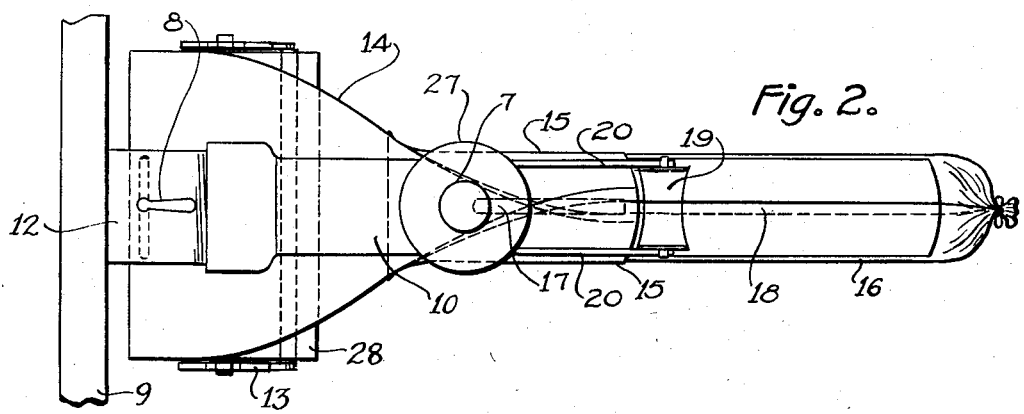
Figure 2 is a plan view of the form of apparatus shown in Figure 1.
Figure 3:
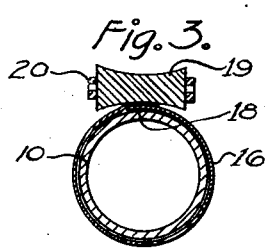
Figure 3 is a sectional view of the form of apparatus shown in Figure 1, the section being taken along the line 3—3 in Figure 1.

Referring to Figures 1, 2, and 3 of the drawing in which is shown a form of apparatus with which this invention may be practiced, reference character 10 indicates a nozzle having a threaded end 11 adapted to screw on the outlet pipe 12 of a conventional sausage meat container 9 to replace the nozzle conventionally used thereon. Since the meat in the container 9 is customarily placed under hydraulic pressure, the valve 8 is adapted and arranged to control the flow of the meat through the nozzle in the usual manner. On the underside of the nozzle 10, there is mounted a bracket 13 adapted to support a roll of casing-forming hydrophilic sheet material 14. On each side of the nozzle there is mounted a tube-former 15 which encircles the nozzle and is arranged to shape the sheet material into a tubing 16 about the nozzle. There is also mounted on the nozzle 10 a liquid reservoir 21, for an acidified aqueous resin solution, having a lid 7 and means such as a wick 17 for applying this solution to at least one of the overlapping surfaces of the hydrophilic sheet to form a longitudinal seam 18. An arcuate roller or shoe 19 heated by electric means or the like is supported on a forked spring 20 and is positioned to apply heat and pressure to the seam 18.

It is desirable to feed the sheet material in such a position that the center and the edges of the sheet are displaced an equal distance from the longitudinal axis of the nozzle. This is done, according to the embodiment of the invention shown in Figures 1 and 2, by forming the nozzle with a reverse curve at the end adjacent to the meat container, and there is provided a guide roller 28 which is so positioned that its upper surface lies in the same plane with the axis of the free end of the nozzle 10. Thus, when the roll of sheet material is passed over this roller, it is roughly at the same level as the center of the nozzle and is suitably positioned for the formation of the tubing. It is to be understood that the nozzle may be reversed so that the roll 14 is positioned on the top side of the nozzle while the resin solution reservoir is on the underside, in which case the seam is formed on the under side of the nozzle. Instead of using a wick 17, an equivalent means such as a roller or disk which dips into the resin solution and then contacts an edge of the sheet material may be employed, and such alternative means is particularly adapted when the nozzle is reversed.

Figure 3 is a cross-section of the nozzle shown in Figure 1 and taken along the line 3—3 thereof, in which is illustrated the nozzle 10, and the sheet material 16 surrounding the nozzle and overlapping at the top to form the seam 18. There is also shown the heated roller or shoe 19 that presses the overlapping edges of the seam 18 against the nozzle 10.

In the operation of this invention, the sheet material 14 is passed over the guide roller 28 through the forming means 15 and shaped thereby into a continuous tubing 16 having overlapping edges to form a seam 18. Between the overlapping edges there is applied an acidified aqueous solution of the resin from the wick 17, and the edges are then pressed together by means of the arcuate heated roller or shoe 19 bearing on the upper surface of the nozzle. After the seamed tubing 16 passes beyond the end of the nozzle 10, the tubing is tied and then may be filled with sausage meat. The flow of the sausage meat is controlled by means of the valve 8 and, if desired, the stuffed casing is twisted at intervals to provide sausage links.

Figure 4:
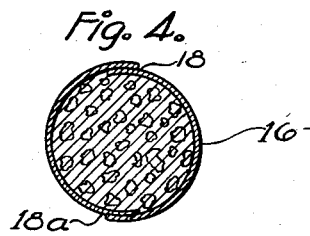
Figure 4 is a cross-section of a form of package embodying the invention.
Figure 5:
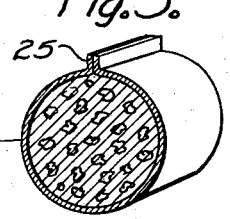
Figure 5 is a sectional view of another form of package embodying the invention.

It is to be understood that the seam produced by the tube-forming means may be a single flat overlapping seam as shown in Figure 3, or there may be produced a casing having two flat longitudinal seams 18 and 18a as shown in Figure 4. In another embodiment, the edges of the sheet material may be brought together in abutting relation to form an upstanding seam 25 as shown in Figure 5. Such a seam is particularly advantageous when the casing is to be used for "skinless" frankfurters inasmuch as the upstanding fin 25 may be readily grasped by the operator or by mechanical means to facilitate stripping a casing from the cooked sausage. It has been found that in a tubing having an upstanding seam of the type shown in Figure 5, that the casing will tear along the base of the seam in a regular manner. Accordingly, it is possible with the sausage shown in Figure 5 to strip the casings by automatic machinery rather than by hand, which is not possible with the seamless frankfurter-size casings heretofore employed because they do not tear in any regular manner.

While reference has been made for purpose of description to the use of the invention in the preparation of sausages, it is to be understood that the invention is not limited to such stuffed products but is equally advantageous for the production of other stuffed products of a plastic nature, for example, ice cream, fats, scrapple, and other meat products, as well as butter, cheese, lard, shortening, and the like, and it is to be further understood that changes and variations may be made without departing from the spirit and scope of the invention as defined in the appended claims.

I claim:

1. The method of forming a food package by simultaneously forming a container and stuffing the container with edible material comprising moving hydrophilic cellulosic sheet material having edge portions in a longitudinal direction, applying an aqueous solution of partially polymerized melamine-formaldehyde resin and lactic acid having a pH of 4.5 to 5.5 to an edge portion of the hydrophilic cellulosic sheet material while it is being moved in a longitudinal direction and the edge portions are being positioned in opposed relation, positioning the edge portions of the hydrophilic cellulosic sheet material in opposed relation with the applied resin solution between the opposed edge portions, and subjecting the opposed edge portions of the hydrophilic cellulosic sheet material while it is being moved in a longitudinal direction to heat and pressure sufficient to advance the polymerization of the melamine-formaldehyde resin to the heat-hardened state to join and seal together the edge portions of the hydrophilic cellulosic sheet material while it is being moved in a longitudinal direction, and stuffing the container with edible material as the container is formed.

2. The method of forming a food package by simultaneously forming a container and stuffing the container with edible material comprising moving hydrophilic regenerated cellulose sheet material having edge portions in a longitudinal direction, applying an aqueous solution of partially polymerized melamine-formaldehyde resin and lactic acid having a pH of 4.5 to 5.5 to an edge portion of the hydrophilic regenerated cellulose sheet material while it is being moved in a longitudinal direction and the edge portions are being positioned in opposed relation, positioning the edge portions of the hydrophilic regenerated cellulose sheet material in opposed relation with the applied resin solution between the opposed edge portions, and subjecting the opposed edge portions of the hydrophilic regenerated cellulose sheet material while it is being moved in a longitudinal direction to heat and pressure sufficient to advance the polymerization of the melamine-formaldehyde resin to the heat-hardened state to join and seal together the edge portions of the hydrophilic regenerated cellulose sheet material while it is being moved in a longitudinal direction, and stuffing the container with edible material as the container is formed.

3. The method of forming a food package by simultaneously forming a container and stuffing the container with edible material comprising moving hydrophilic cellulose ether sheet material having edge portions in a longitudinal direction, applying an aqueous solution of partially polymerized melamine-formaldehyde resin and lactic acid having a pH of 4.5 to 5.5 to an edge portion of the hydrophilic cellulose ether sheet material while it is being moved in a longitudinal direction and the edge portions are being positioned in opposed relation, positioning the edge portions of the hydrophilic cellulose ether sheet material in opposed relation with the applied resin solution between the opposed edge portions, and subjecting the opposed edge portions of the hydrophilic cellulose ether sheet material while it is being moved in a longitudinal direction to heat and pressure sufficient to advance the polymerization of the melamine-formaldehyde resin to the heat-hardened state to join and seal together the edge portions of the hydrophilic cellulose ether sheet material while it is being moved in a longitudinal direction, and stuffing the container with edible material as the container is formed.

4. The method of forming a food package by simultaneously forming a container and stuffing the container with edible material comprising moving hydrophilic denitrated nitrocellulose sheet material having edge portions in a longitudinal direction, applying an aqueous solution of partially polymerized melamine-formaldehyde resin and lactic acid having a pH of 4.5 to 5.5 to an edge portion of the hydrophilic denitrated nitrocellulose sheet material while it is being moved in a longitudinal direction and the edge portions are being positioned in opposed relation, positioning the edge portions of the hydrophilic denitrated nitrocellulose sheet material in opposed relation with the applied resin solution between the opposed edge portions, and subjecting the opposed edge portions of the hydrophilic denitrated nitrocellulose sheet material while it is being moved in a longitudinal direction to heat and pressure sufficient to advance the polymerization of the melamine-formaldehyde resin to the heat-hardened state to join and seal together the edge portions of the hydrophilic denitrated nitrocellulose sheet material while it is being moved in a longitudinal direction, and stuffing the container with edible material as the container is formed.

WALTER B. KUNZ.

REFERENCES CITED

The following references are of record in the file of this patent:

UNITED STATES PATENTS

| Number | Name | Date |
| --- | --- | --- |
| 1,846,575 | Weingand | Feb. 23, 1932 |
| 1,905,999 | Ellis | Apr. 25, 1933 |
| 2,001,031 | Landt | May 14, 1935 |
| 2,060,906 | Snyder | Nov. 17, 1936 |
| 2,108,022 | Salemme | Feb. 8, 1938 |
| 2,197,357 | Widmer | Apr. 6, 1940 |
| 2,210,436 | Weingand | Aug. 6, 1940 |
| 2,318,121 | Widmer | May 4, 1943 |
| 2,346,417 | Cornwell et al. | Apr. 11, 1944 |
| 2,350,861 | Argy | June 6, 1944 |
| 2,384,462 | Goodman | Sept. 11, 1945 |
| 2,395,077 | Southwick | Feb. 19, 1946 |
| 2,423,428 | Pollard | July 1, 1947 |
| 2,431,035 | Goepfert | Nov. 18, 1947 |
| 2,432,542 | Pitzl | Dec. 16, 1947 |
| 2,481,155 | Schaefer | Sept. 6, 1949 |